United States Patent [19]
Mouri et al.

[11] Patent Number: 5,383,026
[45] Date of Patent: Jan. 17, 1995

[54] METHOD AND APPARATUS FOR DETERMINING THE POSITION AND THE CONFIGURATION OF AN OBJECT UNDER OBSERVATION

[75] Inventors: Naotake Mouri, 661-51 Ishizaka, Yagoto, Tenpaku-ku, Nagoya-shi, Aichi-ken; Koji Akamatsu; Akihiro Goto, both of Aichi, all of Japan

[73] Assignees: Naotake Mouri, Aichi; Mitsubishi Denki Kabushiki Kaisha, Tokyo, both of Japan

[21] Appl. No.: 872,305

[22] Filed: Apr. 23, 1992

[30] Foreign Application Priority Data

Aug. 7, 1991 [JP] Japan .................. 3-198126

[51] Int. Cl.$^6$ .................................. G01B 11/24
[52] U.S. Cl. .................. 356/376; 356/375; 250/561
[58] Field of Search ........... 356/128, 376, 375, 377, 356/336, 338, 337, 371, 445, 1, 4, 141, 152; 250/561; 219/121.6, 121.78, 121.62

[56] References Cited

U.S. PATENT DOCUMENTS

| | | | |
|---|---|---|---|
| 2,645,971 | 7/1953 | Herbst | 356/376 |
| 4,322,627 | 3/1982 | Pirlet | 356/376 |
| 4,480,919 | 11/1984 | Asano et al. | 356/376 |
| 4,492,472 | 1/1985 | Asano et al. | 356/376 |
| 4,588,297 | 5/1986 | Inazaki et al. | 356/376 |
| 4,637,716 | 1/1987 | Auweter et al. | 356/337 |
| 4,708,483 | 11/1987 | Lorenz | 356/376 |
| 4,966,455 | 10/1990 | Avni et al. | 356/446 |
| 4,966,457 | 10/1990 | Hayano et al. | 356/338 |

OTHER PUBLICATIONS

Patent Abstracts of Japan, Abstract of Published Application No. 60-15528 to T. Oohashi, Jan. 26, 1985.
Patent Abstracts of Japan, Abstract of Published Application No. 58-18105 to Yuuichirou Asano, Feb. 2, 1983.
Patent Abstracts of Japan, Abstract of Published Application No. 03-44504 to Masahiro Hokari, Feb. 26, 1991.
Patent Abstracts of Japan, Abstract of Published Application No. 58-87448 to Yoshio Ueshima, May 25, 1983.
Patent Abstracts of Japan, Abstract of Published Application No. 1-258887 to Toru Nakada, Oct. 16, 1989.
Patent Abstracts of Japan, Abstract of Published Application No. 61-14514 to Takao Yamaguchi, Jan. 22, 1986.
Patent Abstracts of Japan, Abstract of Published Application No. 63-127106 to Satoshi Itami, May 31, 1988.
Patent Abstracts of Japan, Abstract of Published Application No. 2-309257 to Keiji Saneyoshi, Dec. 25, 1990.
Patent Abstracts of Japan, Abstract of Published Application No. 2-93344 to Makoto Kanebako, Apr. 4, 1990.
Patent Abstracts of Japan, Abstract of Published Application No. 59-160744 to Kazuya Ichikawa, Sep. 11, 1984.
Patent Abstracts of Japan, Abstract of Published Application No. 2-80185 to Kaoru Katayama, Mar. 20, 1990.
Patent Abstracts of Japan, Abstract of Published Application No. 2-297008 to Katsue Kotari, Dec. 7, 1990.

*Primary Examiner*—Hoa Q. Pham
*Attorney, Agent, or Firm*—Sughrue, Mion, Zinn, Macpeak & Seas

[57] ABSTRACT

The invention permits determination of the position and/or the configuration of an object by impinging a laser light beam onto the object in a light scattering medium, and detecting the trace of a scattered light beam, by cameras.

17 Claims, 5 Drawing Sheets

METHOD AND APPARATUS FOR DETERMINING THE POSITION AND THE CONFIGURATION OF AN OBJECT UNDER OBSERVATION

BACKGROUND OF THE INVENTION

The invention relates to a method and an apparatus for determining the position and/or the configuration of an object under observation.

Conventional methods for determining the configuration of an object use a coaxial method in which a laser light beam is impinged on the object, and a reflected light is detected by the camera and a position and a configuration of the object are determined.

FIG. 10 illustrates the principle of the conventional coaxial method. As shown in the figure, a laser light beam 5 is impinged on an object 2 and is reflected to a light receiving portion of a detector 3 (camera). From the known positions and angles of the laser source 1 and camera 3, a position and a configuration of the object are calculated.

Although the method is suitable for a very accurate measurement, a detector 3 must be set so that its optical axis is coaxial or coincident with the direction of the propagating wave, which is often difficult and is applicable only to those objects having special shapes and materials.

If the object does not reflect the incident light at all, it is difficult to measure the surface of the object since there is no reflected light. And in the case of a complex surface of the object, it is often difficult to measure the surface of the object for the reason that cameras can not be set in the direction of the reflected light.

further difficulty exists in the optical methods, mainly due to the fact that they do resort to information concerning the conditions of the surface of an object and that they neglect all the information concerning the light beam itself.

SUMMARY OF THE INVENTION

It is therefore an object of the present invention to provides a method and an apparatus for determining the configuration as well as the surface condition of an object by measuring the scattered locus of the laser beam.

In order to carry the out the object, them is provided a method for determining the configuration of an object, comprising steps of impinging on the object a laser beam emitted from a laser; providing a light scattering medium into the laser beam path; detecting a locus of the laser beam by at least one detection means, preferably said means is located non-coaxially with respect to the laser beam;

and further provided an apparatus for determining the configuration of an object, comprising a laser source for emitting laser beam; a light scattering medium for scattering the laser beam; and at least one camera for detecting the scattered laser beam, preferably said at least one camera is at a position non-coaxially with respect to the laser beam.

DETAILED DESCRIPTION OF THE PREFERRED EMBODIMENTS

Figure 1:
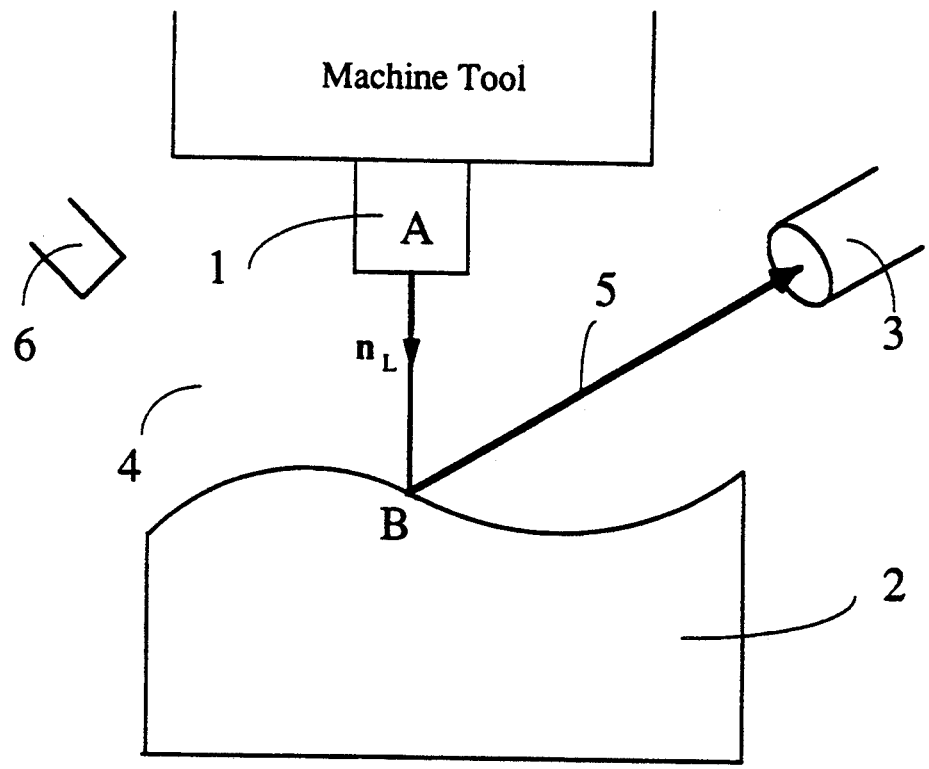
FIG. 1 is a schematic diagram of the arrangement of a laser mounted on mandrel of a machining tool and an object, located on an NC table of the tool, for observation.

FIG. 1 illustrates a method of determining the configuration of a workpiece 2 located on a numerically controlled (NC) work table (not shown) of a machine tool by means of a laser 1 mounted on the mandrel of the machine tool. The laser beam may be emitted through an optical fiber onto the object. A reflected laser beam 5 is detected by an observation camera 3, which may be any image sensing device including a CCD camera.

The laser light beam is made visible as it passes through a medium 4 containing microscopic particles (e.g. smoke, saturated water vapor) that scatter light. Other light scattering medium such as colloid liquids, polymer liquids, colored liquids, powder containing liquids, powder containing air, and colored air may be used as well. Instead of these particle containing media, a liquid such as acetone having maximum scattering intensity for the given wavelength of the laser light may be used. If no such light scattering medium is available at hand, an atomizer 6 may be used to provide microscopic particles in the paths of the laser light beam. It should be apparent that such atomizer 6 is not necessary if the measurement is done in a liquid or gas that may scatter the laser light beam.

No external microscopic particles are needed if such particles actually exist in the measurement environment. The laser 1, the camera 3, and the atomizer 6 may be constructed compactly so as to be mounted integrally on the mandrel. In a light scattering medium as mentioned above, the laser beam 5 becomes bright because of Rayleigh scattering and may be observed from any direction. By determining the path or locus of the laser beam, a point B on the surface of the work piece at which the laser light beam is reflected is determined. By scanning the surface of the work piece and by determining other points B of the surface in a similar manner, the configuration of the work piece may be obtained.

Figure 2:
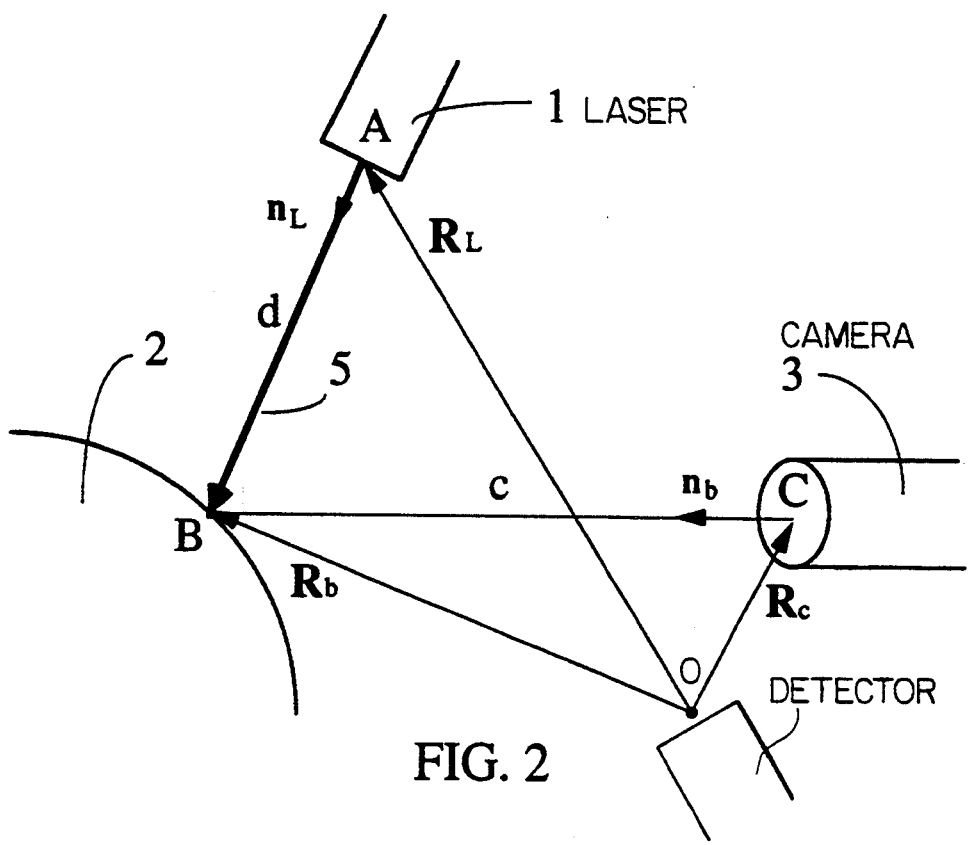
FIG. 2 illustrates a mode of the laser beam method and a structure therefor according to the invention.

FIG. 2 shows the concept of the invention, in which a laser 1 emits a laser beam 5 which impinges on an object 2 and is reflected to a camera 3. An atomizer is not shown in this figure. The medium through which the laser beam is passed is densely populated by particles that may cause Rayleigh scattering. Thus, the laser beam 5 emitted from the laser source 1 may be observed to impinge on a point B of the object 2, and recognized as a trace between A and B. The position vector Rb of the point B as viewed from an arbitrary point of reference O is given by Equation (1)

$$R_b = R_L + d \cdot n_L = R_c + c \cdot n_b \quad (1)$$

where $R_L$ and $R_c$ are the position vector of the laser source 1 and the camera 3 as observed from the point O, respectively. $n_L$ is the unit vector pointing the direction of the laser beam emitted from the source. $n_b$ is the unit vector pointing from the camera to the point B. From Eq. (1) one obtains Eq. (2) below.

$$d \cdot n_L - c \cdot n_b = R_c - R_L \quad (2)$$

The vectors $n_L$, $n_b$, $R_c$ and $R_L$ may be obtained from the measurement of the positions of the origin O, the laser source 1, the object 2, and the camera 3. By solving the simultaneous Eq. (1) and (2), the values of d and c are obtained. Upon insertion of these values of d and c, the vector $R_b$ is determined.

It is noted that Eqs. (1) and (2) are actually three equations for two unknowns. Therefore, one may arbitrarily choose two equations or calculate the minimum error solution using a generalized inverse matrix.

Figure 3:
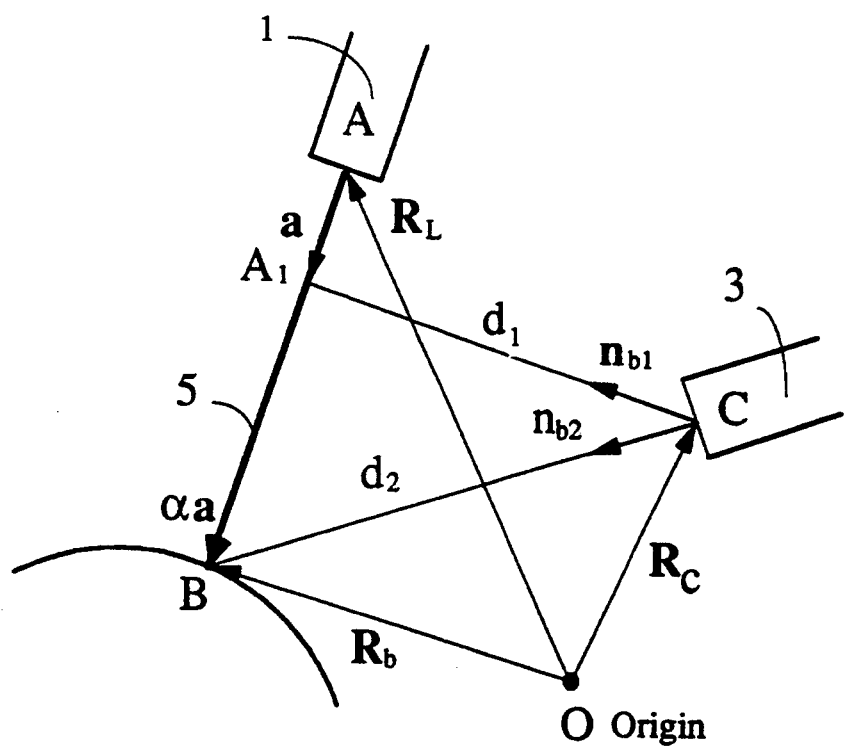
FIG. 3 illustrates another mode of the method of the invention, in which the unknown direction of the laser beam emitted from a laser is determined by determining two points on the beam by a camera, from which points the position of the object is determined.

FIG. 3 illustrates a method for determining the unit vector $n_L$ useful in a case where the direction of the laser source 1 is not known. In this method arbitrary points $A_1$ and B on the laser beam 5 are determined by means of the camera 3. The atomizer is not shown.

The laser beam emitted from the laser source 1 provides the trace of the beam between the points $A_1$ and B, so that the distances $d_1$ and $d_2$ from the camera 3 (at position C) to the points $A_1$ and B, respectively, can determined. The following vectorial relationships (3) and (4) hold regarding the points $A_1$ and B.

$$A_1: a + R_L = R_c + d_1 \cdot n_{b1} \quad (3)$$

$$B: \alpha a + R_L = R_c + d_2 \cdot n_{b2} \quad (4)$$

where $n_{b1}$, $n_{b2}$ are unit vectors pointing from the point C of the camera 3 to the point A and B, respectively, a is the vector pointing from A, the position of the laser, to the point $A_1$, $\alpha a$ is the position vector of the point B as viewed from the point $A_1$, $d_1$ is the distance between the points C and $A_1$, and $d_2$ is the distance between the points C and B. One may regard the point A as the position of the laser and the point B as the point of the object. Eq. (3) and (4) lead to Eq. (5) below.

$$a(R_c - R_L) + \alpha d_1 \cdot n_{b1} - d_2 \cdot n_{b2} = R_c - R_L \quad (5)$$

This is a simultaneous equation for, $\alpha d_1$, and $d_2$, which also gives $d_1$. Inserting the value of d thus obtained in Eq. (6) below, a is determined. The unit vector $n_L$, the unit vector of the laser beam emitted from the laser is given by Eq. (7).

$$a = R_c - R_L + d_1 \cdot n_{b1} \quad (6)$$

$$n_L = a / |a| \quad (7)$$

Based on this unit vector $n_L$, the vector $R_b$ of the point B as viewed from the origin O may be determined in the same manner as discussed in connection of FIG. 2.

Figure 4:
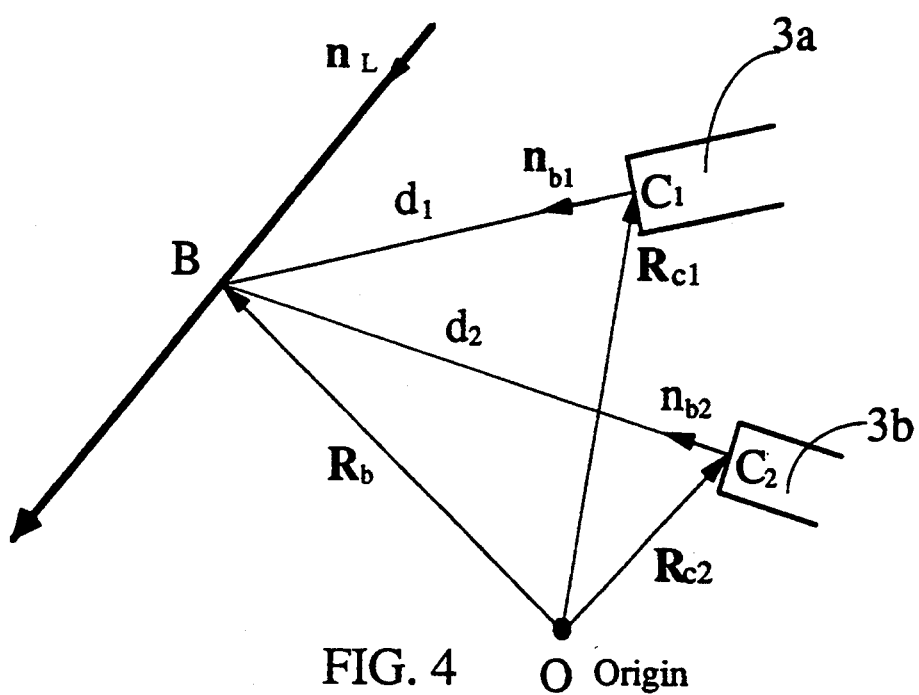
FIG. 4 illustrates another mode of the method of the invention, in which the position of the laser is unknown and a point on the beam is determined in order to determine the configuration of the object.

FIG. 4 shows a method that may be used for determining the position of a point B on the laser beam 5 without knowing the position of the laser source 1, based on the known direction of the emitted laser beam. A first camera 3a and a second camera 3b are used to observe the point B. The relationship between the position $C_1$ of the first camera 3a and the position $C_2$ of the second camera 3b with reference to the origin O is given by $$d_1 \cdot n_{b1} + R_{C1} = d_2 \cdot n_{b2} + R_{C2} \quad (8)$$

where $R_{C1}$ and $R_{C2}$ are the position vectors of the cameras 3a and 3b, respectively, $n_{b1}$ and $n_{b2}$ are the unit vectors pointing from the respective cameras to the point B, $d_1$ is the distance between the points B and $C_1$, and $d_2$ is the distance between the points B and $C_2$. Eqs. (8) and (9) lead to $$d_1 \cdot n_{b1} - d_2 \cdot n_{b2} = R_{C2} - R_{C1} \quad (9)$$

This simultaneous equation gives $d_1$ and $d_2$, which in turn gives the position vector $R_b$ of the point B as viewed from the origin O, according to a Equation;

$$R_b = d_1 \cdot n_{b1} + R_{C1} \quad (10)$$

The point B may be chosen on the surface of the object of interest, to thereby determine the configuration of the object.

Figure 5:
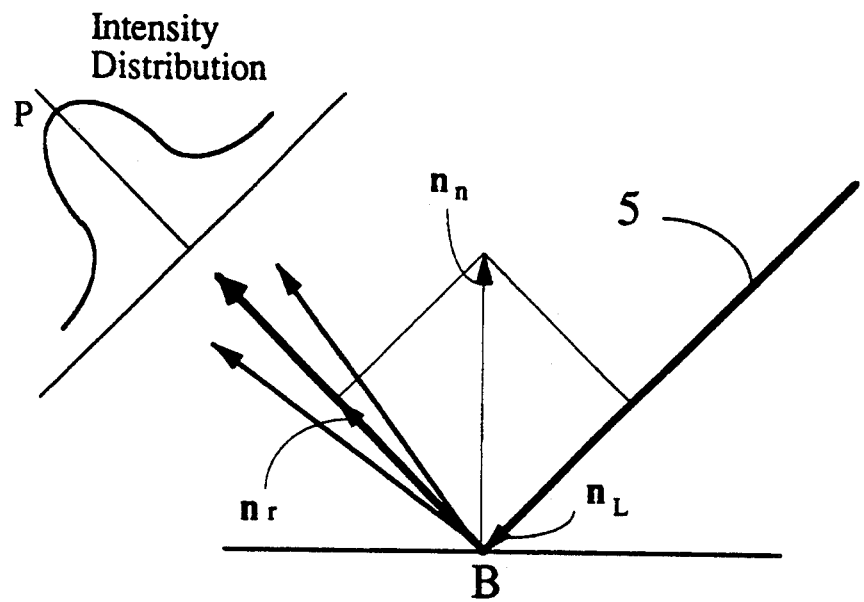
FIG. 5 illustrates still another mode of the method of the invention in which the configuration of an object is determined from the normal vector at that position by observing the beams incident on and reflected from the position.

FIG. 5 shows the geometric relationship among vectors used in a method for determining a normal unit vector $n_n$ on the surface of an object by determining a unit vector $n_r$ representing the laser beam reflected from the point B on the object and the unit vector $n_L$ representing the beam incident on the point B. The vector $n_n$ is given in terms of $n_r$ and $n_L$ as follows.

$$n_n = n_r - n_L / |n_r - n_L| \quad (11)$$

In conventional methods a quick determination of such normal vectors as mentioned above is difficult in that, even after many representative points on the surface of the object has been obtained, calculations are required to determine them. In contrast the invention may easily provide the normal vectors $n_n$.

In cases where the surface under observation has a rough surface, the laser beam reflected therefrom has a Gaussian distribution in intensity as shown in FIG. 5. Accordingly, the maximum intensity direction P of the reflected beam is obtained by setting a threshold in the processing of the image data. It can therefore improve the precision of the measurement by obtaining the continuous point of the maximum quantity of light.

As discussed above the reflected beam normally has a spatial intensity distribution about the vector $n_r$ as shown in FIG. 5. Thus, it is possible to determine the roughness of the surface by measuring the spatial intensity distribution. This measurement also enables detection of scars and sharp edges on the surface along with the detection of the roughness of the surface.

Figure 6:
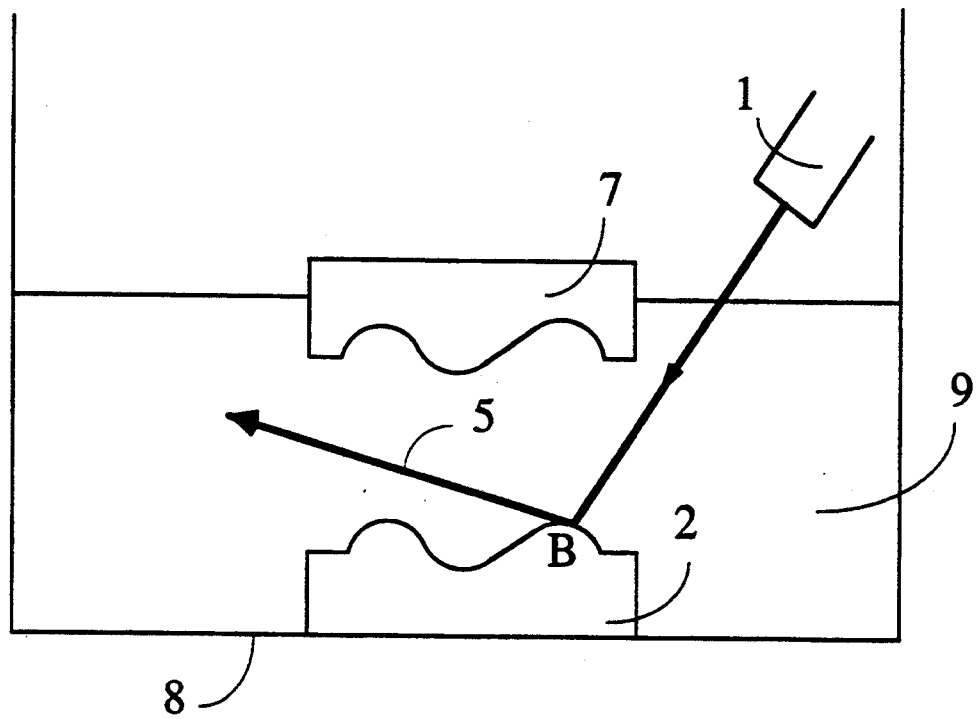
FIG. 6 illustrates use of this the invention for determining the configuration of a work piece dipped in a liquid for electrical discharge machining.

FIG. 6 illustrates use of a laser beam 1 to determine the configuration of a work piece 2 in an electrical discharge machining vessel 8. A typical electrical discharge machining is carried out in oil 9 stored in the vessel 8. Since such a work piece 2 is dipped in the oil 9 or water which scatters the laser beam, the configuration and the roughness of the work piece may be determined in the manner described above.

Use of mirrors and an optical fiber will make the measurement easy, and may permit a determination of the configuration and the roughness of the electrode as the laser beam reaches every points of the electrode. And also it may permit a determination of the configuration of the electrode on real time processing and may change the machining condition by the result of the measurement. In this case, measurement may be carried out at a practically constant temperature, since the heat capacity of the liquid (oil or water) is very great.

Figure 7:
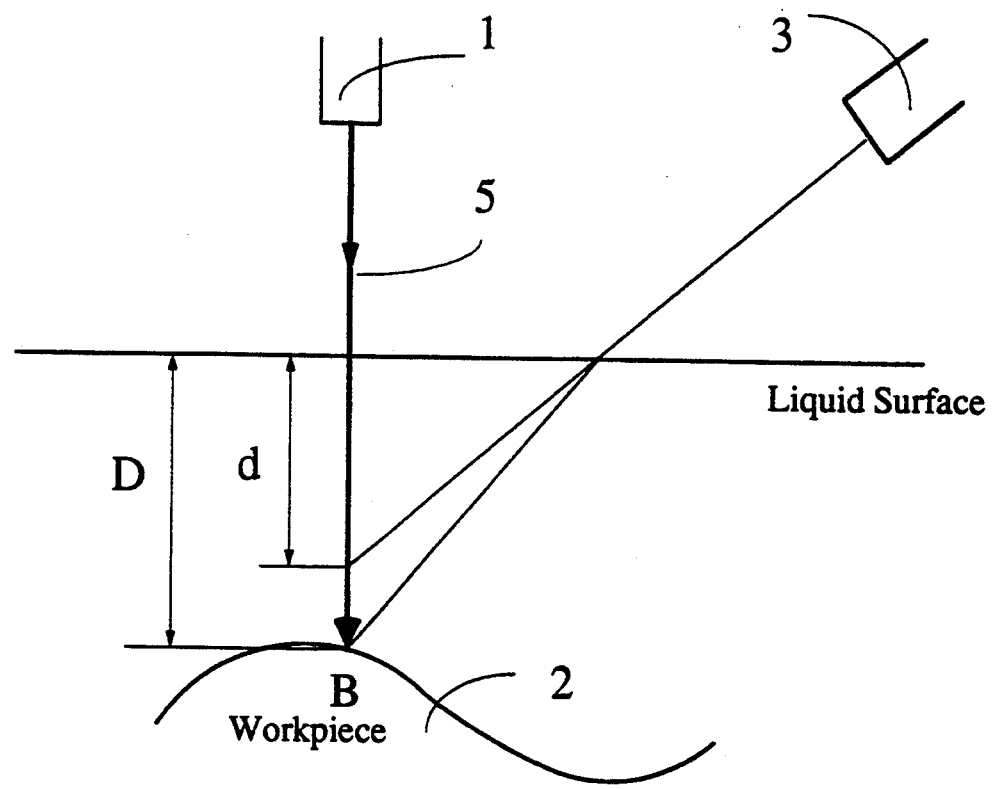
FIG. 7 is an illustration for explaining the effect of refractive index of a liquid involved in the method according to the invention.

It should be understood, however, that the refraction index of the liquid must be taken into account in such measurements as mentioned above. The true distance D between the free surface of the liquid and the surface of the work piece is given by $D = n \cdot d$, where n is the refraction index of the liquid and d is the apparent distance, as shown in FIG. 7.

Figure 8:
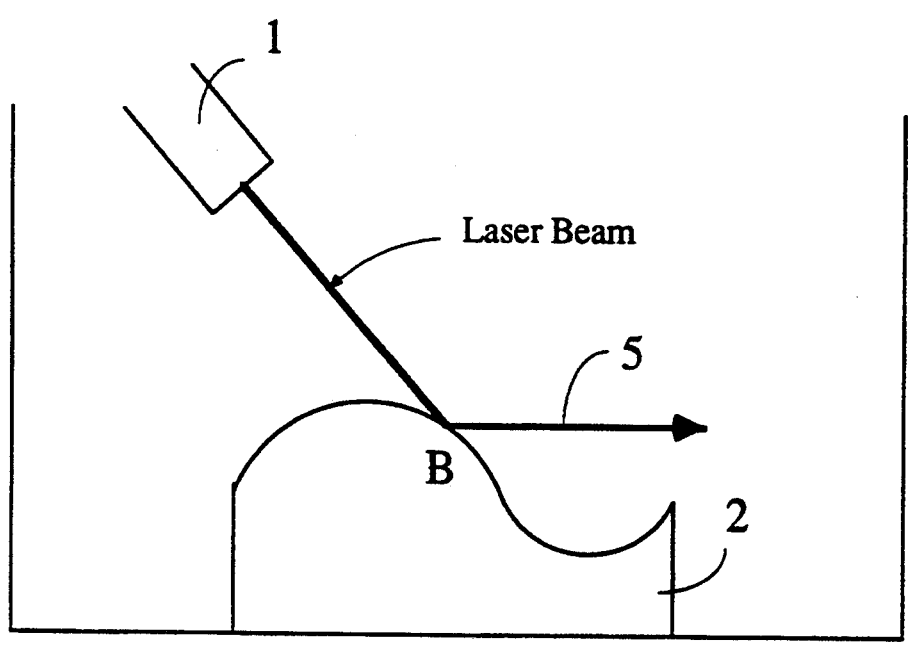
FIG. 8 illustrates how scattering of light may be utilized in the method according to the invention.

FIG. 8 shows a method for determining the configuration and the position of an object 2 by utilizing scattering of a laser beam 5 emitted from a laser 1. The object is located in an atmosphere rich in dispersed light scattering particles (such as smoke and saturated water vapor). The scattering of the laser beam incident on the surface of the object 2 is observed by the camera located non-coaxially of the laser beam. The point B where the beam 5 is reflected may be observed as a very bright spot, so that by determining the brightest point in the spot the position of the surface is determined.

Figure 9:
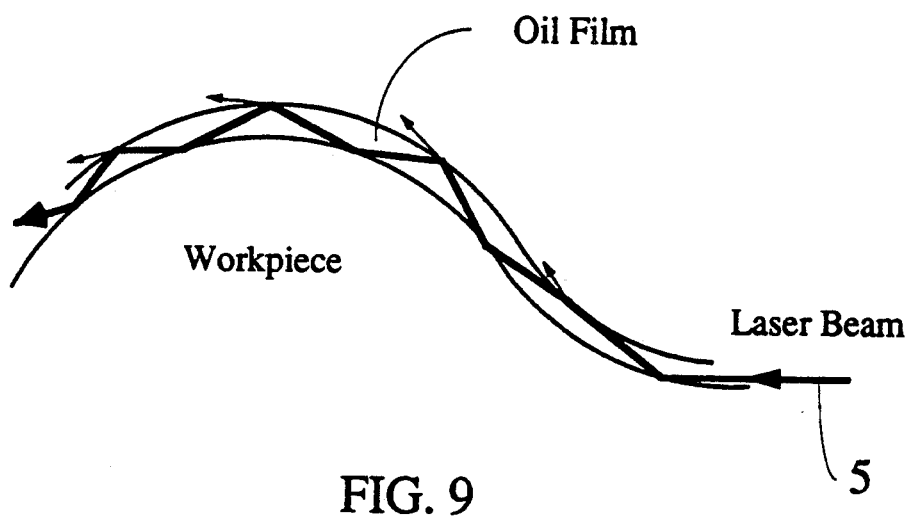
FIG. 9 illustrates a method according to the invention in which a film of oil is deposited on an object having a mirror like surface and a laser beam is directed into the film to observe light escaping from the film to determine the configuration of the object.
Figure 10:
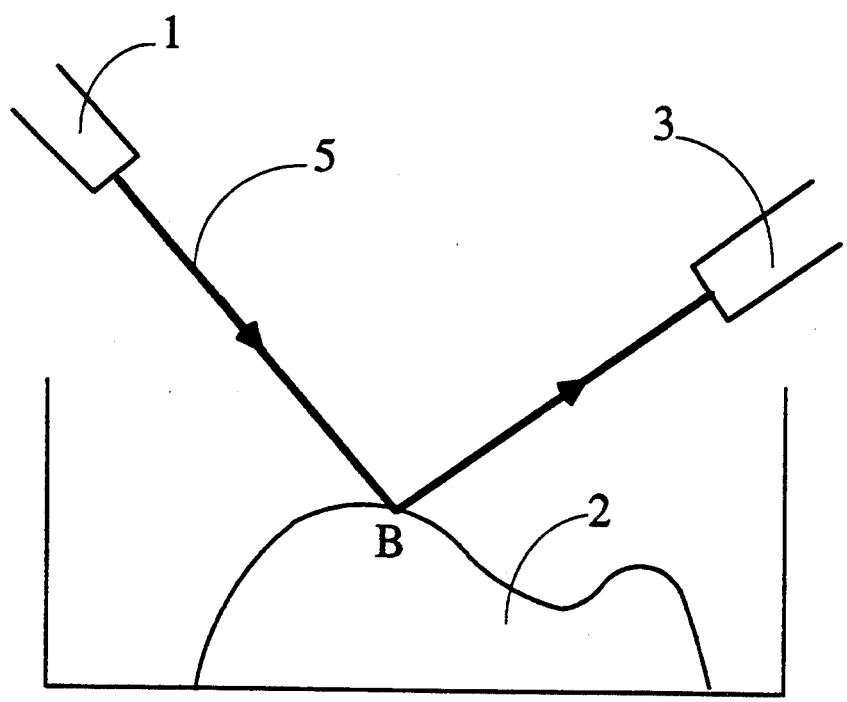
FIG. 10 illustrates a conventional method utilizing a laser beam.

FIG. 9 illustrates the use of an oil film deposited on the surface of an object. The oil is chosen from materials which may scatter laser light. This method enables the determination of the configuration of an object having a mirror like surface. When a laser beam is introduced into an end of the oil film, the laser beam will propagate in the film, repeating reflection therein. By observing the intensity of laser light escaping from the oil, the locus along the surface of the object is observed as a spatial surface and the configuration of the object may be determined.

The intensity of the scattering light fluctuates since the particles heterogeneously distributed fluctuates in the gas or in the liquid. Accordingly, by equalizing the measured value of the scattered light, the precision of the measurement is improved.

When the suspended particles in the gas or liquid are moving along the surface of the solid, by observing the movement of the suspended particles using laser doppler, the position on the solid is measured very accurately. That is, by making the forced flow of the fluid (gas or liquid) including suspended particles and by measuring the direction of the movement of the suspended particles, the configuration of the surface is determined.

According to the invention, the determination of the configuration of an object may be carried out by measuring the scattered locus of the laser beam or the scattered point where the laser beam impinged to the object, it can measure even the surface of the object that does not reflect the laser beam at all. The method of this invention may be used irrespective of the conditions of the surface, so that the invention may be applied to a mirror like surfaces as well as rough surfaces.

What is claimed is:

1. A method for determining a position of a point on an object, comprising steps of:
impinging on said object an incident laser beam emitted from a laser, said object directing said incident beam as a reflected beam which is received by a camera, said incident and reflected beams defining a laser beam path;
providing a light scattering medium into the laser beam path so as to produce visible scattered light;
detecting the visible scattered light by at least one detection means located at a position not on said laser beam path extending from said laser to said camera in order to determine a locus of said laser beam.

2. The method according to claim 1, wherein a position vector on the point on an object from an arbitrary point is determined by detecting the scattered light of the laser beam.

3. The method according to claim 2, wherein a position represented by a vector $R_b$ on the point of an object from an arbitrary point is determined from an Equation:

$$R_b = R_L + d \cdot n_L = R_c + c \cdot n_b$$

where $R_L$ and $R_c$ are the position vectors of said laser and said camera, respectively, in reference to an arbitrary origin O, $n_L$ is the unit vector pointing in the direction of the laser beam emitted from said laser, $n_b$ is the unit vector pointing from said camera to said point on said object and d is the distance from said laser to the point on the object.

4. The method according to claim 2, wherein a position represented by a position vector $R_b$ on the point of an object from a arbitrary point is determined by:
detecting two points $A_1$ and B on said scattered laser beam by said camera, and
determining a unit vector $n_L$ pointing the direction of said laser beam emitted from said laser source, from following Equations:

$$A_1: a + R_L = R_c + d_1 \cdot n_{b1}$$

$$B: \alpha a + R_L = R_c + d_2 \cdot n_{b2}$$

$$a = R_c - R_L + d_1 \cdot n_{b1}$$

$$n_L = a/|a|$$

where $R_L$ and $R_c$ are the position vectors of said laser and said camera, respectively, in reference to said arbitrary point, $n_{b1}$ and $n_{b2}$ are the unit vector pointing the direction form said camera to respective points $A_1$ as viewed form said laser, $\alpha$ a is a position vector of said point B as viewed from said laser source, and $d_1$ and $d_2$ are the distances from said camera to said points $A_1$ and B, respectively.

5. The method according to claim 1, wherein said detecting means is located non-coaxially with respect to the laser beam path.

6. The method according to claim 1, wherein the position of a plurality of points on an object are determined.

7. The method according to claim 6, further comprising moving said medium past said plurality of points.

8. The method according to claim 7, further comprising step of making doppler laser measurements of said moving medium.

9. The method according to claim 1, further comprising the step of compensating for the refractive index of said light scattering medium 10. The method according to claim 1, further comprising measuring spacial intensity distribution of said reflected beam.

11. A method for determining a position of a point on an object, comprising the steps of:
    impinging on said object an incident laser beam emitted from a laser, said object directing said incident beam as a reflected beam, said incident and reflected beams defining a laser beam path;
    providing a light scattering medium into the laser beam path; and
    detecting a locus of said laser beam by at least one detection means located at a position not on said laser beam path;
    wherein a position vector on the point on an object from an arbitrary point is determined by detecting the scattered light of the laser beam; and
    wherein a position represented by a position vector $R_b$ on the point on the object from an arbitrary point is determined by detecting the point by a first and a second camera, from the following Equations:

$$d_1 \cdot n_{b1} + R_{C1} = d_2 \cdot n_{b2} + R_{C2}$$

$$R_b = d_1 \cdot n_{b2} + R_{C1}$$

where $R_{C1}$ and $R_{C2}$ are the position vectors of said first and second camera, respectively, $n_{b1}$ and $n_{b2}$ are the unit vectors pointing in the directions from said first and second camera, respectively, to said point B on said object, and $d_1$ and $d_2$ are the distances from said first and second camera, respectively, to said point B on said object.

12. An apparatus for determining a position of a point on an object, comprising:
    a laser source for emitting a laser beam;
    a light scatting medium for scattering the laser beam;
    at least one camera for detecting said scattered laser beam light;
    wherein a position represented by a vector $R_b$ on the point of the object from an arbitrary point is determined, from the following Equation:

$$R_b = R_L + d \cdot n_L = R_c + c \cdot n_b$$

where $R_L$ and $R_c$ are the position vectors of said laser and a camera, respectively, in reference to an arbitrary origin O, $n_L$ is the unit vector pointing in the direction of the laser beam emitted from said laser, $n_b$ is the unit vector pointing from said camera to said point on said object, d is the distance from said laser to the point on the object and c is the distance form the camera to the point of the object.

13. The apparatus according to claim 12, wherein said camera is disposed non-coaxially with respect to said laser beam.

14. The apparatus according to claim 12, wherein said laser beam is movable to a plurality of points on an object.

15. The apparatus according to claim 12, wherein said medium is at least one of a gas and a liquid.

16. An apparatus for determining a position of a point on an object, comprising:
    a laser source for emitting a laser beam;
    a light scatting medium for scattering the laser beam;
    at least one camera for detecting said scattered laser beam light;
    wherein a position represented by a vector $R_b$ on the point of the object from an arbitrary point is determined by detecting two points $A_1$ and B on said scattered laser beam by a camera, and by determining the unit vector $n_L$ pointing in the direction of said laser beam emitted from said laser source, from the following Equations:

$$A_1: a + R_L = R_c + d_1 \cdot n_{b1}$$

$$B: \alpha a + R_L = R_c + d_2 \cdot n_{b2}$$

$$a = R_c - R_L + d_1 \cdot n_{b1}$$

$$n_L = a/|a|$$

where $n_{b1}$ and $n_{b2}$ are the unit vector pointing in the direction from said camera to respective points $A_1$ and B, respectively, a is a position vector of said point $A_1$ as viewed from said laser, $\alpha$ a is a position vector of said point B as viewed from said laser, and $d_1$ and $d_2$ are the distances from said camera to said points $A_1$ and B, respectively.

17. An apparatus for determining a position of a point on an object comprising:
    a laser source for emitting a laser beam;
    a light scatting medium for scattering the laser beam;
    at least one camera for detecting said scattered laser beam light;
    wherein a position represented by a vector $R_b$ on the point B from an arbitrary point is determined, by detecting a points B on said scattered laser beam by first and second cameras, from the following Equations:

$$d \cdot n_{b1} + R_{C1} = d_2 \cdot n_{b2} + R_{C2}$$

$$R_b = d_1 \cdot n_{b1} + R_{C1}$$

wherein $R_{C1}$ and $R_{C2}$ are the position vectors of said first and second cameras, respectively, $n_{b1}$ and $n_{b2}$ are the unit vectors pointing in the directions from said first and second cameras, respectively, to said point B on said object, and $d_1$ and $d_2$ are the distances from said first and second cameras, respectively, to said point B on said object.

* * * * *